May 20, 1930.  W. M. CARTER  1,759,687
ROAD MAGNET
Filed Nov. 27, 1928  2 Sheets-Sheet 1

INVENTOR
W. M. Carter
BY
ATTORNEY

May 20, 1930.  W. M. CARTER  1,759,687
ROAD MAGNET
Filed Nov. 27, 1928    2 Sheets-Sheet 2
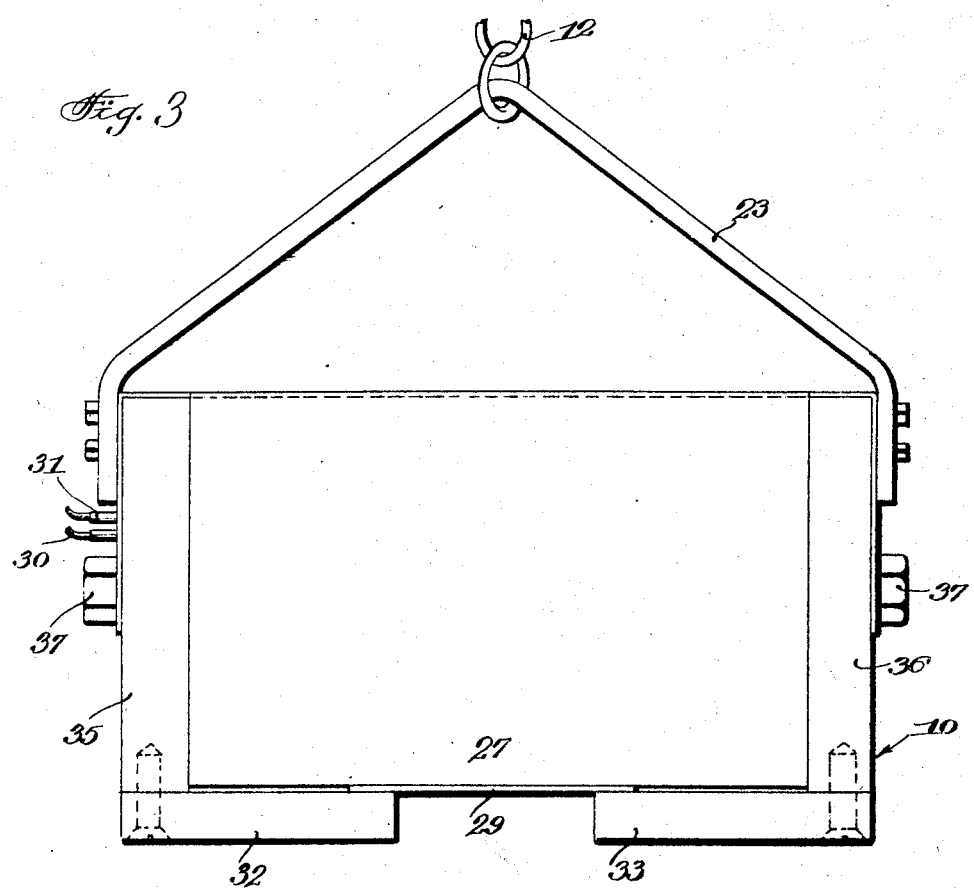
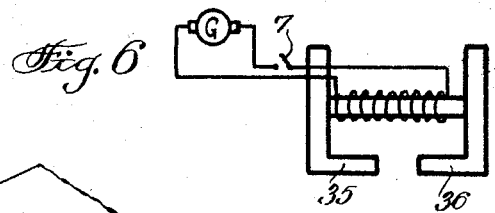
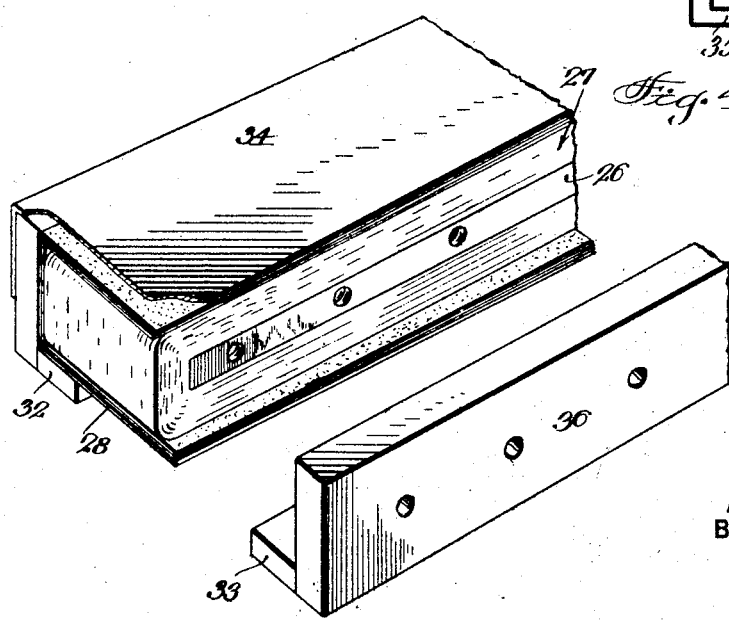
INVENTOR
W. M. Carter
BY
ATTORNEY Patented May 20, 1930

1,759,687

UNITED STATES PATENT OFFICE

WALTER M. CARTER, OF GREENWOOD, MISSISSIPPI

ROAD MAGNET

Application filed November 27, 1928. Serial No. 322,246.

This invention relates to magnets designed for use in picking up nails, screws or any other metallic articles from road ways such as would be liable to puncture the tires of automobiles.

A primary object of the invention is to provide a magnet of this character which may be mounted on a suitable vehicle, preferably a truck and drawn along over the road way for picking up objects liable to puncture tires, said objects being released from the magnet when desired and shoveled up and carried to a suitable place of deposit.

Another object is to provide a magnet of this character which may be mounted on a truck together with the necessary motor for magnetizing it and which when not desired for use may be readily removed from the truck to permit the latter to be used for other purposes.

Another object of the invention is to provide an efficient supporting means for the magnet which are adjustable to position it the desired height above the roadway and which may be quickly manipulated for so positioning the magnet.

In carrying out these objects, the invention is susceptible of a wide range of modification without departing from the spirit or sacrificing any of the advantages of the claimed invention; there being shown in the drawings for illustrative purposes a preferred and practical form, in which:

Fig. 3 is an enlarged end elevation of the magnet; and

Fig. 4 is an enlarged detail perspective view of a portion of the magnet with parts broken out to show the interior construction and with one of the side plates removed;

Fig. 5 is a similar view of the removed side plate.

Fig. 6 is a diagram of the magnet wing.

Figure 1:
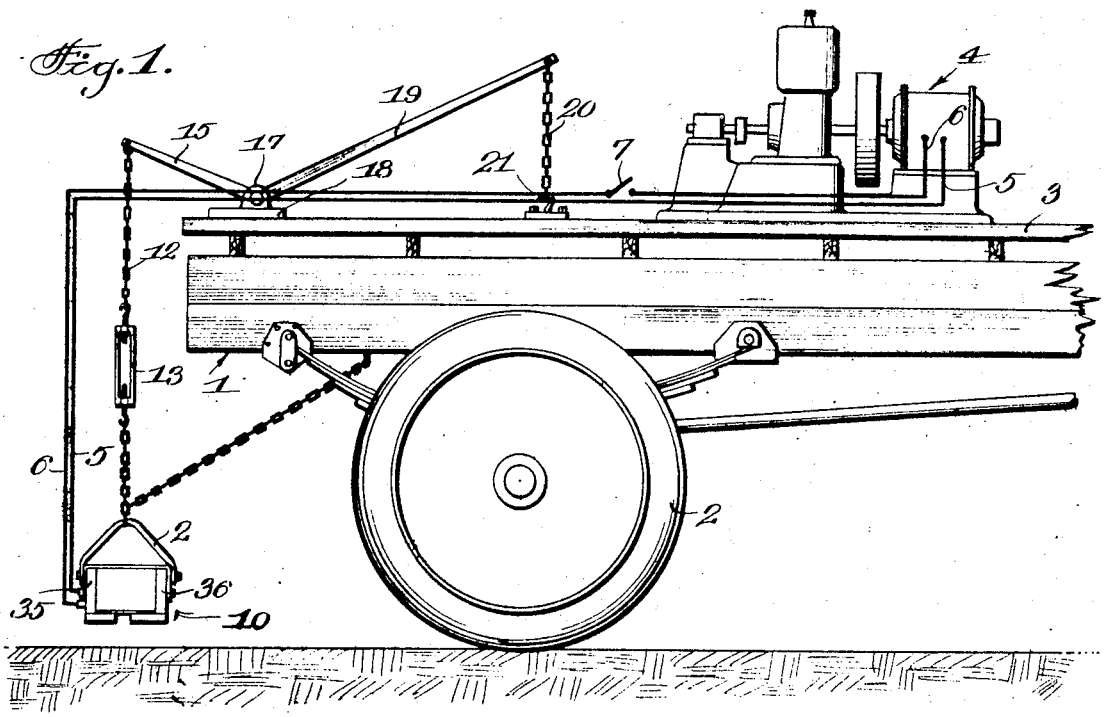
Figure 1 represents a side elevation of the rear portion of a truck having this improved road magnet mounted thereon together with the motor for operating it.

In the embodiment illustrated a truck frame or chassis 1 is shown having the usual rear wheels 2 and on the floor 3 of which is mounted a small motor 4 for energizing the magnet and which constitutes a part of a small Delco or other plant suitable for this purpose. Leading from the motor 4 are the wires 5 and 6 which supply current to the magnet 10 and in which is located a switch 7 for controlling the current and cutting it off when desired from the magnet.

The magnet 10 is preferably of a length corresponding to the entire width or slightly greater than that of the truck in connection with which it is used so that it will extend over the width of the road way to be cleaned and it is suspended from the truck body by means of chains 11 and 12 having turnbuckles 13 therein for adjusting their length to vary the position of the magnet in relation to the road way. The upper ends of these chains 11 and 12 are shown connected with the ends of arms 14 and 15 which extend obliquely upward from a cross rod or shaft 16 journaled in suitable bearings 17 carried by pillow blocks 18 bolted to or otherwise secured to the truck bottom 3.

Extending forwardly from the rock shaft 16 is a lever 19 which is arranged at an obtuse angle to the arms 14 and 15 as shown clearly in Fig. 1 and has its free end adjustably connected by means of a chain 20 with a hook 21 secured to the truck bottom.

Figure 2:
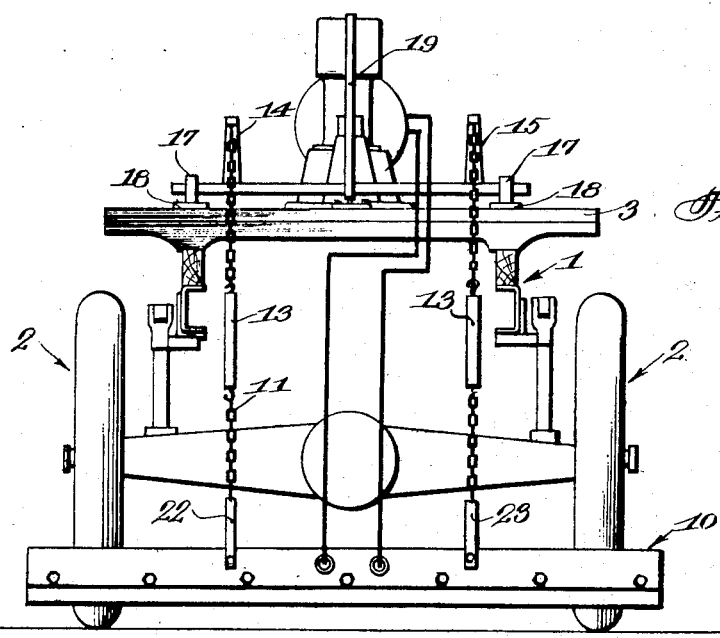
Fig. 2 is a rear elevation thereof.

Suitable hangers 22 and 23 connect chains 11 and 12 with the magnet 10 at longitudinally spaced intervals as shown clearly in Fig. 2. These hangers are preferably made bail-shaped and are composed of strap irons.

It will thus be seen that the magnet 10 may be adjusted by means of the lever 19 operating to rock the shaft 16 and which lever is secured in adjusted position by means of the chain 20 any one of the links of which may be connected with the hook 21. The magnet may be further adjusted by means of the turnbuckles 13 which may be manipulated for fine adjustment or to lift one end of the magnet higher than the other according of the surface of the road way to be cleaned.

Small chains 24 and 25 connect the magnet at longitudinally spaced points with the truck chassis for preventing the magnet from swinging back and forth which would so vary its position in relation to the roadway as to render it inoperative when so swung.

The magnet 10 is shown in detail in Figs. 3, 4, 5 and 6 and comprises a soft Russian iron core 26 wound with No. 10 double cotton square magnet wire and having the lead wires 5 and 6 entering and leaving the magnet respectively through fibered tubes 30 and 31. The coil 27 so formed is insulated with Fuller board of suitable thickness, the sides being preferably insulated by two layers of $\frac{1}{32}$ of an inch board while the center core has three layers of $\frac{1}{32}$ of an inch of Fuller board, with lap joints. The outer surface of the coil is insulated with two layers of $\frac{1}{32}$ of an inch of Fuller board and a 22 gauge brass strip 29 is disposed between the coil 27 and bottom plates 32 and 33 and the top and ends of the magnet are also covered with 22 gauge brass as shown at 30. The side plates 35 and 36 are connected with the bottom plates 32 and 33 by counter-sunk bolts, as shown in dotted lines in Fig. 3, and with the core 26 by means of $\frac{5}{8}$ inch stud bolts 37.

In Fig. 6 a diagram of the wiring of the magnet is shown.

When a road is to be cleaned of puncturing objects such as nails, spikes, screws and the like the little Delco plant including the motor 4 is mounted on the floor of a truck, the pillow plates 18 secured to said floor near the rear end thereof and a hook 21 mounted on the floor in advance of said plates. The lever 19 is then placed in position by mounting the rock shaft 16 in the bearings of the pillow blocks and the magnet 10 is connected with said lever by the chains 11 and 12 and with the motor by the wires 5 and 6 and the apparatus is ready for use, it being of course understood that the magnet is adjusted to locate it in proper relation to the road way which is preferably about three or four inches above said road way and which is accomplished by manipulating either the turntuckles 13 or adjusting the chain 20. The truck is then driven slowly over the road way and the magnet will pick up all metallic objects along the road and when it is desired to unload the magnet the switch 7 is closed to cut off the current after which the objects will drop on to the road and may be shoveled up and placed in the truck or thrown to one side as desired.

When it is not desired to use this apparatus for road cleaning the motor and the magnet with its operating mechanism may be readily removed from the truck and the truck used for other purposes.

Without further description it is thought that the features and advantages of the invention will be readily apparent to those skilled in the art, and it will, of course, be understood that changes in the form, proportion and minor details of construction may be resorted to without departing from the spirit of the invention or its scope as claimed.

I claim:

1. A magnetic road cleaning apparatus comprising pillow blocks having bearings to be mounted on a truck, a rock shaft mounted in said bearings and having lever arms extending laterally therefrom in opposite directions and at an obtuse angle to each other, adjustable suspension means carried by one of said arms, a magnet carried by said suspension means, means carried by the other arm adapted for adjustable connection with a truck, and magnetizing means for the magnet adapted to be carried by the truck.

2. A magnetic road cleaning apparatus comprising a rock shaft adapted to be mounted on a structure, longitudinally spaced arms extending laterally from said shaft in one direction, another arm extending laterally from said shaft in the opposite direction and located between said first mentioned arms, said oppositely extending arms being arranged at an obtuse angle to each other, a chain connected with the intermediate arm for adjustably connecting said arm with a supporting structure, chains carried by the first mentioned arms and having means for adjusting them independently of each other, means for connecting a magnet to said chains, and means for energizing the magnet adapted to be carried by the structure on which the magnet supporting means is mounted.

3. A magnetic road cleaning apparatus comprising a rock shaft adapted to be mounted on a structure, longitudinally spaced arms extending laterally from said shaft in one direction, another arm extending laterally from said shaft in the opposite direction and located between said first mentioned arms, said oppositely extending arms being arranged at an obtuse angle to each other, a chain connected with the intermediate arm for adjustably connecting said arm with a supporting structure, chains carried by the first mentioned arms and having means for adjusting them independently of each other, means for connecting a magnet to said chains, means for energizing the magnet adapted to be carried by the structure on which the magnet supporting means is mounted, and means for preventing the swinging of the magnet during its passage over a road way.

WALTER M. CARTER.